United States Patent
Rietzler

(10) Patent No.: US 8,279,070 B2
(45) Date of Patent: Oct. 2, 2012

(54) METHOD FOR PRODUCING A SECURITY LAYERED CONSTRUCTION AND SECURITY LAYERED CONSTRUCTION AND IDENTIFICATION DOCUMENTS CONTAINING SUCH A CONSTRUCTION

(75) Inventor: Manfred Rietzler, Marktoberdorf (DE)

(73) Assignee: Smartrac Technology Ltd., Amsterdam (NL)

( * ) Notice: Subject to any disclaimer, the term of this patent is extended or adjusted under 35 U.S.C. 154(b) by 0 days.

(21) Appl. No.: 12/573,763

(22) Filed: Oct. 5, 2009

(65) Prior Publication Data

US 2010/0083485 A1 Apr. 8, 2010

Related U.S. Application Data

(63) Continuation of application No. 10/579,937, filed as application No. PCT/DE2005/000125 on Jan. 28, 2005, now Pat. No. 7,612,677.

(30) Foreign Application Priority Data

Jan. 28, 2004 (DE) .................. 10 2004 004 469

(51) Int. Cl.
*G08B 13/14* (2006.01)

(52) U.S. Cl. ................. 340/572.8; 340/572.1; 340/5.86; 235/492

(58) Field of Classification Search ............... 340/572.1, 340/572.8, 572.7, 5.86; 310/313 R; 342/42; 156/277, 292, 300; 235/492, 380, 385
See application file for complete search history.

(56) References Cited

U.S. PATENT DOCUMENTS

| | | | |
|---|---|---|---|
| 4,506,148 A | 3/1985 | Berthold et al. | 235/380 |
| 5,255,430 A | 10/1993 | Tallaksen | 29/827 |
| 5,955,949 A | 9/1999 | Cocita | 340/572.1 |
| 6,001,211 A | 12/1999 | Hiroyuki | 156/277 |
| 6,088,230 A | 7/2000 | Finn et al. | 361/737 |
| 6,412,701 B1 | 7/2002 | Kohama et al. | 235/488 |
| 6,518,885 B1 | 2/2003 | Brady et al. | 340/572.7 |
| 7,059,535 B2 | 6/2006 | Rietzler | 234/492 |
| 7,612,677 B2 * | 11/2009 | Rietzler | 340/572.8 |
| 2003/0000070 A1 | 1/2003 | Lee et al. | 29/600 |
| 2003/0164611 A1 | 9/2003 | Schneider et al. | 283/57 |

FOREIGN PATENT DOCUMENTS

| | | |
|---|---|---|
| DE | 44 10 732 A1 | 10/1995 |
| DE | 196 01 358 C2 | 7/1996 |
| DE | 100 32 128 A1 | 1/2002 |
| DE | 102 01 112 A1 | 10/2002 |
| DE | 102 05 914 A1 | 8/2003 |
| EP | 0 079 047 A2 | 4/1982 |
| EP | 0 745 955 A | 12/1996 |
| EP | 1 073 993 B1 | 11/2002 |
| RU | 2 158 204 C1 | 10/2000 |
| WO | 94/12963 | 6/1994 |
| WO | 97/26621 | 7/1997 |
| WO | 01/04834 A1 | 1/2001 |

OTHER PUBLICATIONS

Contact IC card and the manufacturing method thereof.

(Continued)

*Primary Examiner* — Anh V La
(74) *Attorney, Agent, or Firm* — Proskauer Rose LLP

(57) ABSTRACT

A method for producing a security layered construction as well as a security layered construction for an identification document (61), particularly for personal identification, having a transponder layer (20) and at least one cover layer (38, 39), the transponder layer being covered using the at least one cover layer to form a seal with the wire conductor positioned interposed, and at least one viewing side (62) of the at least one cover layer or transponder layer being provided with security printing (63).

9 Claims, 8 Drawing Sheets

OTHER PUBLICATIONS

RFID technique—Principle and application for radio-sensitive responders and contactless IC cards, Jun. 2001.
International Search Report for International Application No. PCT/DE2005/000125 (4 pages).
International Preliminary Report on Patentability, date of issuance Oct. 18, 2006, including Written Opinion of the International Searching Authority (8 pages).

* cited by examiner

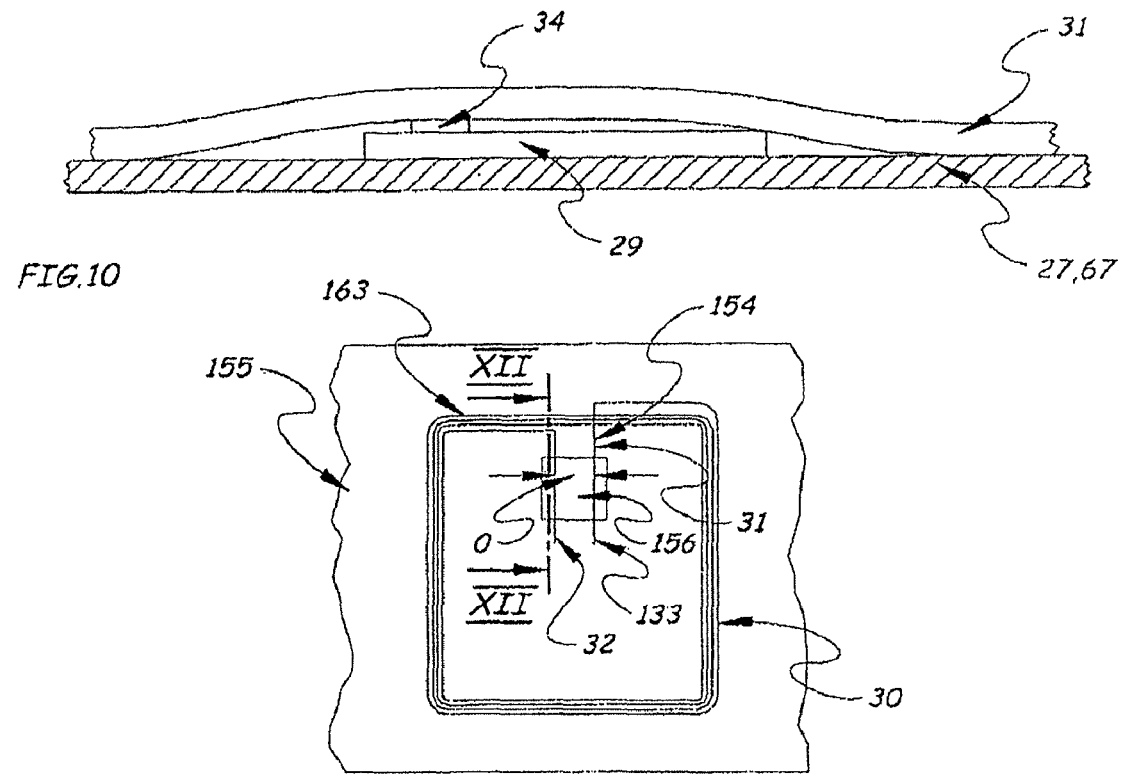
FIG.10
FIG.11
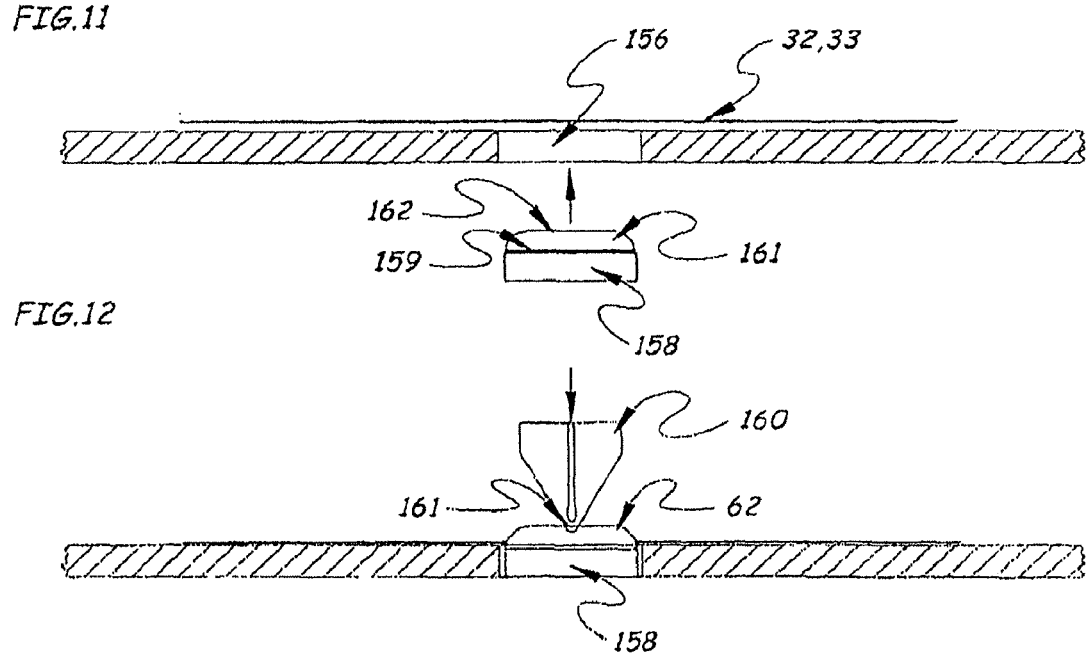
FIG.12
FIG.13

METHOD FOR PRODUCING A SECURITY LAYERED CONSTRUCTION AND SECURITY LAYERED CONSTRUCTION AND IDENTIFICATION DOCUMENTS CONTAINING SUCH A CONSTRUCTION

RELATED APPLICATIONS

This application is a continuation of U.S. application Ser. No. 10/579,937, filed May 19, 2006, which is a national stage application of International Application No. PCT/DE2005/000125 filed Jan. 28, 2005, which claims priority to German Patent Application No. DE 10 2004 004 469.4 filed Jan. 28, 2004, the contents of all of which are incorporated herein by reference in their entirety.

FIELD OF THE INVENTION

The present invention relates to a method for producing a security layered construction for an identification document having at least two layers, specifically a transponder layer and at least one cover layer, particularly for personal identification.

BACKGROUND OF THE INVENTION

So-called contactless cards, which allow contactless access to a memory chip that forms a transponder together with an antenna coil, have already been in use for some time and are preferably used in connection with automated access controls. Examples of these are access controls in the field of passenger transportation in the local service field or even automated access controls on ski lift facilities. Furthermore, using contactless cards of this type in the field of security-relevant access controls is also known, in order to allow only specific persons access to specific regions, for example.

However, except for the above-mentioned fields of use, until now no general use of contactless cards or general contactless, electronically readable personal identification carriers is known, since a general universal usage is frequently prevented by the absence of corresponding infrastructure or peripheral equipment for detecting electronically stored data.

In addition, sometimes a lack of acceptance of electronic personal identification systems is recognizable, which may frequently be attributed to an authenticity check of the personal identification carrier used not being possible without any problems.

SUMMARY OF THE INVENTION

The present invention is therefore based on the object of providing a possibility for performing an authenticity check of electronic identification carriers using simple means and particularly for ensuring a high measure of security against forging.

This object is achieved by a method for producing a security layered construction according to Claim 1.

In the method according to the present invention, to produce a security layered construction for an identification document having at least two layers, specifically a transponder layer and at least one cover layer, a wire conductor is positioned using a wire conductor laying device to implement at least one coil turn in a plane on a transponder substrate and, at the same time, bonded in at least some points to the transponder substrate to produce the transponder layer. After connection of the wire conductor to terminal areas of a chip arrangement, the transponder layer is covered using a cover layer to form a seal with the wire conductor positioned interposed. In addition, at least one viewing side of a cover layer or the transponder layer is provided with security printing.

The method according to the present invention allows the simple integration of a transponder, including a wire conductor used to implement a coil and a chip arrangement in contact therewith, into a layered construction which is especially suitable for use as an identification document or for integration into an identification document in that a viewing side of the at least one cover layer or the transponder layer is provided with security printing.

The method according to the present invention may be used for producing identification documents both for personal identification and for animal and object identification.

The combination according to the present invention of the security printing with the layered construction including the transponder provides the possibility of performing an authenticity check, even without the aid of electronic data access means for access to the data stored on the chip arrangement, through a visual check of the security printing through conventional inspection of the security printing, or performing a check of the identification data using the suitable peripheral devices, particularly a read device for detecting the personal identification data stored in the chip arrangement.

In addition, the method according to the present invention allows the production of a security layered construction which, through the arrangement of the transponder and the security printing in and/or on one and the same security layered construction, through the automatic assignment between the stored data on the chip arrangement and the security printing, allows the provision of a personal document which is as secure from forgery as possible. Thus, particularly because of the sealing cover of the transponder layer, which may be produced through a planar bonding of the cover layer to the transponder layer in a lamination or even gluing procedure, it is not possible to change the assignment between the security printing and the transponder without destroying the security layered construction. The afore-mentioned statement indicates that the term "sealing cover" means any cover which is to prevent direct access to the transponder and/or the chip arrangement.

An increase of the security from forgery is already provided if the security printing has forgery-safe features like banknote printing. If the security printing is additionally provided with individualized, e.g. person-specific identifying data, for example, the security printing allows not only an authenticity check in regard to the authenticity of the document, but also the implementation of a dual identification system, which alternatively allows automatic detection of the data stored on the chip arrangement through a read procedure or detection of the identifying data included by the security printing through conventional inspection.

It has been shown to be especially advantageous if the wire conductor is arranged on the transponder substrate in such a way that the wire conductor is guided off over the terminal areas of the chip arrangement previously placed on the transponder substrate and the wire conductor is subsequently brought into contact with the terminal areas. As a result of this surface arrangement of the chip arrangement and the wire conductor forming the transponder coil, in a minimum configuration the security layered construction may be implemented through only two layers, specifically the transponder layer and one single cover layer, which covers the transponder layer with the chip arrangement and the wire conductor positioned interposed.

An especially close assignment between the transponder arrangement and/or the chip arrangement of the transponder arrangement and the security printing is achievable if the wire conductor is positioned on the transponder substrate, the back of which is provided with the security printing.

Particularly in the above-mentioned case, it is especially advantageous for the production of the security layered construction if the transponder substrate and at least the chip arrangement placed on the transponder substrate form a base unit in the production of the security layered construction. This method variation offers the special advantage that the base unit may be produced independently from the subsequent manufacturing of the security layered construction and/or an integration of the security layered construction into an identification document by a separately authorized producer, such as a banknote printer, who is then solely responsible for the assignment of the security relevant data on the chip arrangement and in the security printing.

A further advantageous variation for the production of the security layered construction arises if the wire conductor is positioned on the transponder substrate in such a way that the contact ends of the wire conductor provided for the contact with the chip arrangement are guided off over a substrate recess used to receive the chip arrangement and, after placement of the chip arrangement in the substrate recess, are brought into contact with the terminal areas of the chip arrangement.

This method variation allows the subsequent positioning of the chip arrangement on and/or in the transponder substrate, so that the transponder coil, already manufactured by positioning the wire conductor on the transponder substrate while implementing at least one coil turn, may be brought into contact with the chip arrangement.

If the wire conductor laying device is guided in such a way that the contact ends run parallel to one another and transversely to a neighboring wire conductor strand, the smallest possible amount of space is required to implement the transponder arrangement, so that possibly even multiple transponder arrangements may be positioned on one transponder substrate.

It has been shown to be especially advantageous for the positioning of the wire conductor on the transponder substrate through the connection of the wire conductor to the transponder substrate to apply ultrasound to the wire conductor progressing continuously in the direction of the longitudinal axis of the wire, transversely to the longitudinal axis of the wire and to the surface of the transponder substrate. In this way, it is ensured that a bond between the wire conductor and the surface of the transponder substrate which is uniform in the direction of the longitudinal axis of the wire is implemented.

If, in addition, the ultrasound application is performed using a stamp excited using ultrasound, which is provided with a wire guiding capillary parallel to the longitudinal axis to implement a guide nozzle, laying of the wire conductor on the surface of the transponder substrate using arbitrary direction changes and application of ultrasound directly to the wire conductor in the contact region with the transponder substrate directly after the wire conductor exits the guide nozzle become possible.

Depending on the composition of the material used for the transponder substrate, it is possible to produce the bonding forces between the wire conductor and the surface of the transponder substrate for fixing the wire conductor on the transponder substrate through an embedding procedure, i.e., by at least partially sinking the wire circumference into the surface of the transponder substrate. This applies particularly if a thermoplastic material is used for the transponder substrate.

Alternatively, the bonding forces may also be implemented through gluing; for example, if a paper-like material is used for the transponder substrate. An adhesive necessary for this purpose may be applied to the transponder substrate or even to the wire conductor, corresponding sheathing of the wire conductor, for example by using a so-called "baked lacquer", having proved to be especially advantageous for the latter case.

The security layered construction for an identification document according to the present invention has a transponder layer and at least one cover layer, the transponder layer having a wire conductor positioned in one plane on a transponder substrate to implement at least one coil turn, which contacts terminal areas of a chip arrangement. The transponder layer is covered using one cover layer to form a seal, with the wire conductor positioned interposed, and a viewing side of at least one cover layer or the transponder layer is provided with security printing.

In a preferred embodiment of the security layered construction, the chip arrangement is positioned on the transponder substrate, and the wire conductor extends on the transponder substrate with the terminal areas of the chip arrangement positioned interposed.

If, in addition, the security printing is provided on the back of the transponder substrate, as already noted above, an especially close assignment between the transponder and/or the chip arrangement and the security printing is provided.

In a possible variation of the security layered construction, the wire conductor is positioned on the transponder substrate in such a way that the contact ends of the wire conductor provided for the contact with the chip arrangement are guided off over the chip arrangement positioned in a substrate recess and are brought into contact with the terminal areas of the chip arrangement.

If the contact ends of the wire conductor run parallel to one another and transversely to a neighboring wire conductor strand, an especially space-saving arrangement of the transponder arrangement on the transponder substrate is possible. This is all the more true if a bridge region of one contact end runs over the neighboring wire conductor strand.

An especially durable bond between the wire conductor and the surface of the transponder substrate is provided if the wire circumference of the wire conductor is at least partially embedded in the surface of the transponder substrate.

Particularly if the wire conductor is bonded to a transponder substrate made of a material which is essentially not plastically deformable, it is advantageous if the wire conductor is at least partially glued to the surface of the transponder substrate.

In an especially advantageous variation of the security layered construction, the transponder substrate is made of a thermoplastic and received between two cover layers made of a foamed plastic.

The above-mentioned combination allows especially good adhesion of the layers to one another because of penetration of thermoplastic material of the transponder substrate into the pores of the foamed plastic during a lamination procedure. In addition, in a subsequent method step to implement a book cover binding based on the security layered construction, the cover layers may also be bonded to subsequent further layers through an adhesive bond, which is especially durable because of the porosity of the foamed plastic.

High stability and tear resistance is achieved if the transponder substrate is produced using a polyimide or a polyimide derivative.

If the transponder substrate has a fabric structure, the stability and tear resistance in different directions is increased even further. In addition, a fabric structure may be sewed or glued especially durably to further layers. This is especially true for a nylon fabric.

A polyolefin foam is especially suitable for use for the cover layers. Paper-like material properties may be achieved in particular if a polyethylene foam having silicon dioxide as a filler is used.

It has also been shown to be especially advantageous if the security layered construction forms an ID page or is implemented in an ID page.

If the cover layer, positioned diametrically opposite a chip housing, has a window opening to at least partially receive the chip housing, the security layered construction is producible in the smallest possible thickness in spite of the supplementation of the transponder substrate with the cover layers.

Depending on the type of the implementation of the transponder substrate, and particularly in the case in which the transponder substrate is provided with a window opening to receive a chip housing, it may be advantageous for secure hermetically sealed accommodation of the chip to provide a seal layer diametrically opposite the chip housing between the transponder substrate and the cover layer.

If the window opening of the cover layer is filled up flush with a top of the cover layer using a partial region of the transponder substrate and/or the seal layer overlapping the chip housing, an implementation that is plane parallel overall in relation to the surfaces of the security layered construction results, which allows the application of extremely thin binding cover layers without the danger arising that the chip will stand out in the surface.

Particularly with a multi-layered implementation of the transponder substrate and an arrangement of the chip arrangement between the layers thus made possible, especially secure, hermetic sealing may be achieved.

If the security layered construction has at least one cross-sectional reduction along a folding axis to define a book spine, folding over the two page regions of the security layered construction is possible, even with relatively stiff implementation of the security layered construction and/or the transponder substrate.

It is also advantageous if the cover layers are provided with an inner and an outer binding cover layer to implement a book cover binding.

The base unit according to the present invention for producing a security layered construction for an identification document includes a transponder substrate and a chip arrangement, the chip arrangement being attached on an antenna side of the transponder substrate provided for the arrangement of the wire conductor and the back of the transponder substrate being provided with security printing.

The identification document according to the present invention having a security layered construction of the type described above is implemented in one embodiment in the chip card format, i.e., like a so-called "chip card".

In a second embodiment, the identification document according to the present invention having a security layered construction in accordance with the type described above is provided with at least one ID page positioned in a book cover binding.

In the present case, it has been shown to be especially advantageous if the at least one ID page is provided with the security layered construction. Alternatively, it is possible to implement the book cover binding as multi-layered in such a way that the security layered construction is positioned between an inner and an outer binding cover layer.

In the following, preferred exemplary embodiments of the method for producing a security layered construction and/or exemplary embodiments for a security layered construction are described in greater detail with reference to the drawing.

BRIEF DESCRIPTION OF THE DRAWINGS

FIG. 10 shows a partial sectional illustration along section line X-X in FIGS. 1 and 2;

FIG. 11 shows an alternative embodiment of a transponder substrate to the illustration in FIGS. 1 and 2, having a substrate recess to receive a chip arrangement;

FIG. 12 shows a partial sectional illustration of the transponder substrate shown in FIG. 11 along section line XII-XII with placement of the chip arrangement in the substrate recess;

FIG. 13 shows an illustration of the transponder substrate corresponding to FIG. 12 during the contacting of the wire conductor to the terminal areas of the chip arrangement.

DETAILED DESCRIPTION OF THE DRAWINGS

Figure 1:
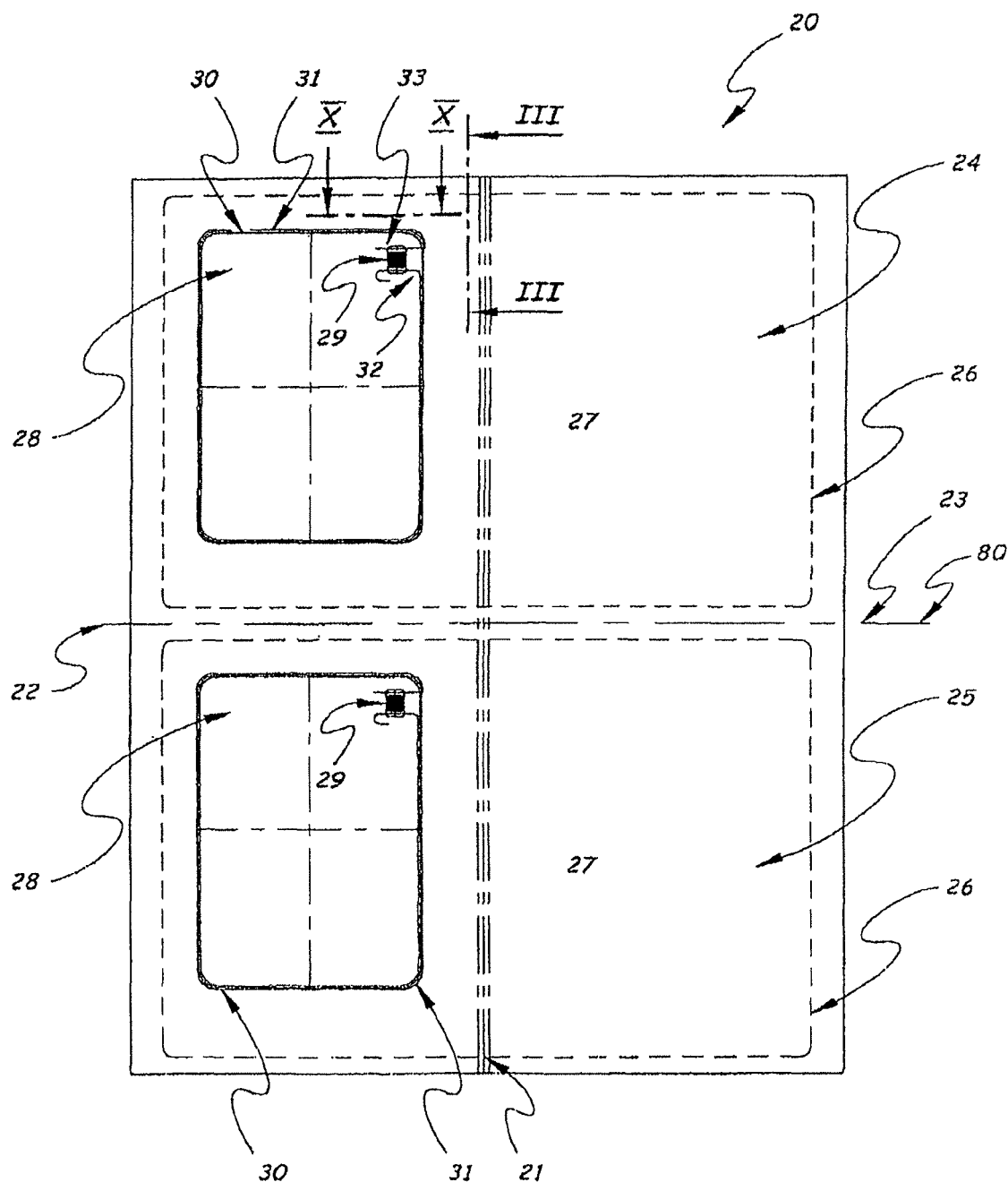
FIG. 1 shows a panel sheet having two transponder substrates for producing ID pages of a personal document in a top view.

FIG. 1 shows a panel sheet 20, which is divided by a folding axis 21 into two page regions 22, 23, which may also be implemented unequally. Two neighboring double leaf blanks 24, 25 extend transversely to the folding axis 21, each running from the left page region 22 into the right page region 23, having outlines 26 which are shown by the dashed line shape. The two identically implemented double leaf blanks 24, 25, positioned on both sides of a middle axis 80, are each implemented as a transponder substrate 27, which in each case is provided in the left page region 22 with a transponder unit 28. The transponder unit 28 includes a chip 29 and an antenna 30 in contact therewith, which is implemented in the exemplary embodiment shown as a wire antenna made from an antenna wire 31 laid on the surface of the transponder substrate 27.

Figure 2:
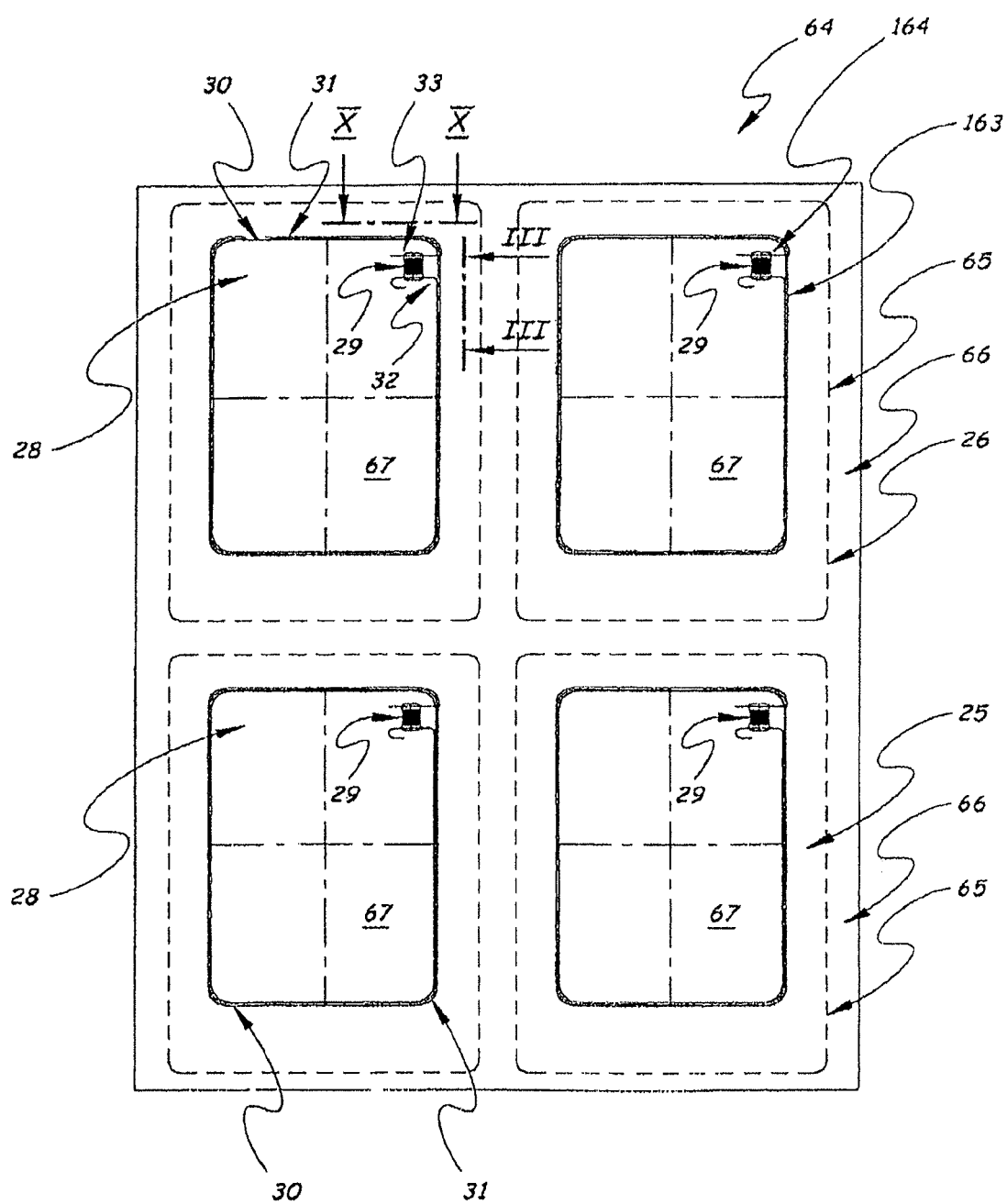
FIG. 2 shows a panel sheet having four transponder substrates for producing a document for personal identification in the chip card format.

FIG. 2 shows a panel sheet 64, which is divided into four chip card formats 66 in accordance with the outlines 65, which are shown by the dashed lines. Corresponding to the chip card formats 66, four transponder substrates 67 are provided, each of which has a transponder unit 28. Each transponder unit 28 includes a chip arrangement 29 and an antenna 30 in contact therewith, which is implemented in the case of the exemplary embodiment shown as a wire antenna made of an antenna wire 31 laid on the surface of the transponder substrate 67.

Figure 3A:
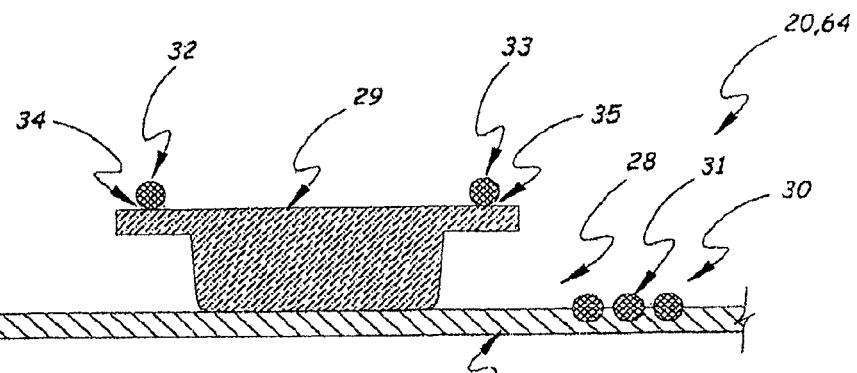
FIGS. 3a through 3c show the production of a security layered construction in a first exemplary embodiment.

FIG. 3a shows a partial sectional view of the transponder substrate 27 or 67 along section line shown in FIGS. 1 and 2 during the arrangement of the transponder unit 28 on the transponder substrate 27 or 67. In the case of the method sequence shown in FIGS. 3a through 3c, the transponder substrates 27 or 67 implemented in the panel sheet 20 or 64 are closed, i.e., implemented as windowless, and the chip arrangement 29 is applied to the surface of the transponder substrate 27 or 67 to produce the transponder unit 28.

Subsequently, the antenna wire 31 is laid in multiple antenna turns with subsequent contacting of wire ends 32, 33 of the antenna 30 to external contacts 34, 35 of the chip arrangement 29 to produce a transponder layer 81.

Figure 3B:
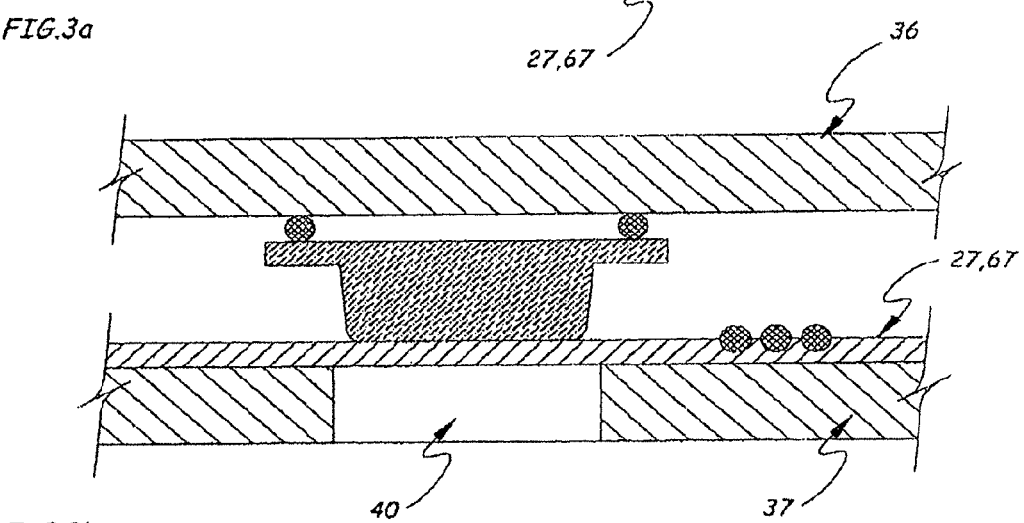

Subsequently, the panel sheet 20 or 64, made of a thermoplastic material, such as polycarbonate, polypropylene, PET, or a polyimide, having the transponder substrates 27 or 67 implemented therein, is covered on both sides with a panel sheet 36, 37 made of a foamed plastic, such as a foamed polyethylene having silicon dioxide as a filler, which has paper-like properties. As may be seen from FIGS. 3b and c, the panel sheet 36, which is used to implement a cover layer 38 on the transponder substrate 27 or 67, is provided with a closed surface, while in contrast the panel sheet 37, which is used to implement a cover layer 39 on the diametrically opposing side of the transponder substrate 27 or 67, is provided with window openings 40. The layered construction shown in FIG. 3b is processed in a laminator (not shown here in greater detail) into a security layered construction 41 shown in FIG. 3c. During the lamination procedure, a protuberance 43, which is tailored to the shape of a chip housing 42 of the chip arrangement 29 and projects into the window 40 of the cover layer 39, forms in the transponder substrate 27 or 67 because of the effect of temperature and pressure. Because of the effect of heat during the lamination procedure, the transponder substrate 27 or 67 is also softened on the surface, with the result that in boundary layers 59 implemented between the transponder substrate 27 or 67 and the cover layers 38, 39, the thermoplastic material of the transponder substrate 27 or 67 penetrates into cavities of the cover layers 38, 39, produced from a porous, elastic plastic material, and after solidification, this leads to anchoring of the cover layers 38, 39 on the surface of the transponder substrate 27 or 67. Because of the porous and elastic implementation of the plastic material of the cover layers 38, 39, regions of the transponder unit 28 projecting out of the plane of the transponder substrate 27 or 67, such as the antenna wire 31 and a chip carrier 44 of the chip 29 provided here, penetrate into the cover layer 38, causing deformation of the cover layer 38, without standing out on a free contact surface 45 of the cover layer 38.

Figure 3C:
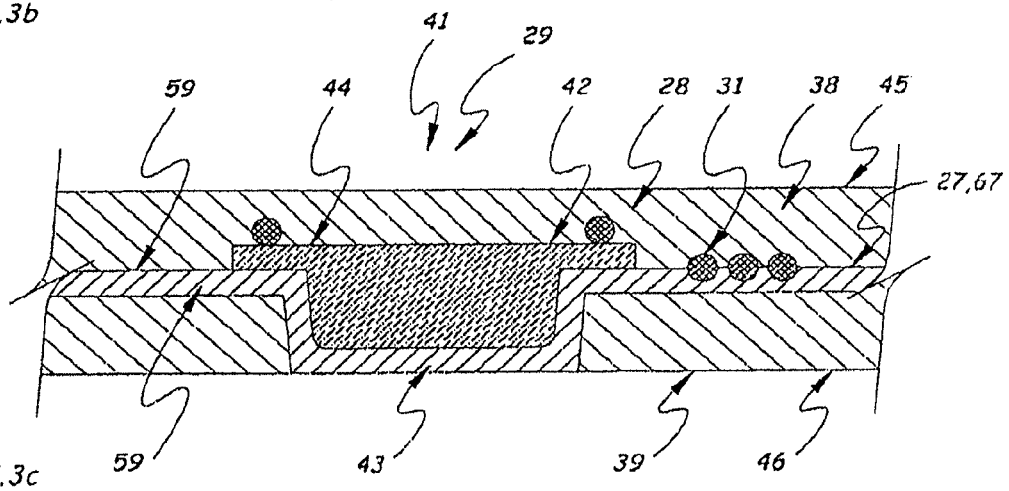

As FIG. 3c shows, the result of the lamination procedure is a security layered construction 41 having plane-parallel contact surfaces 45, 46.

Figure 4A:
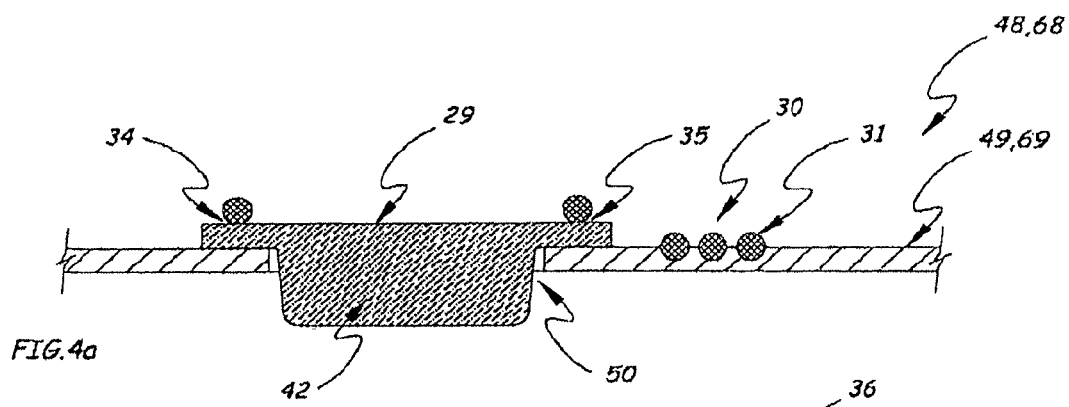
FIGS. 4a through 4c show the production of a security layered construction in a second exemplary embodiment.
Figure 4B:
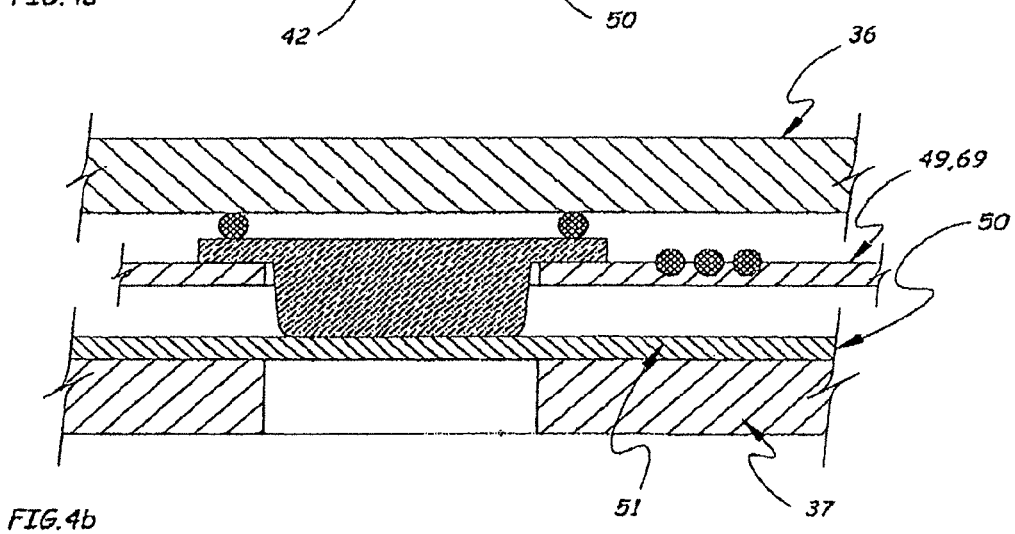
Figure 4C:
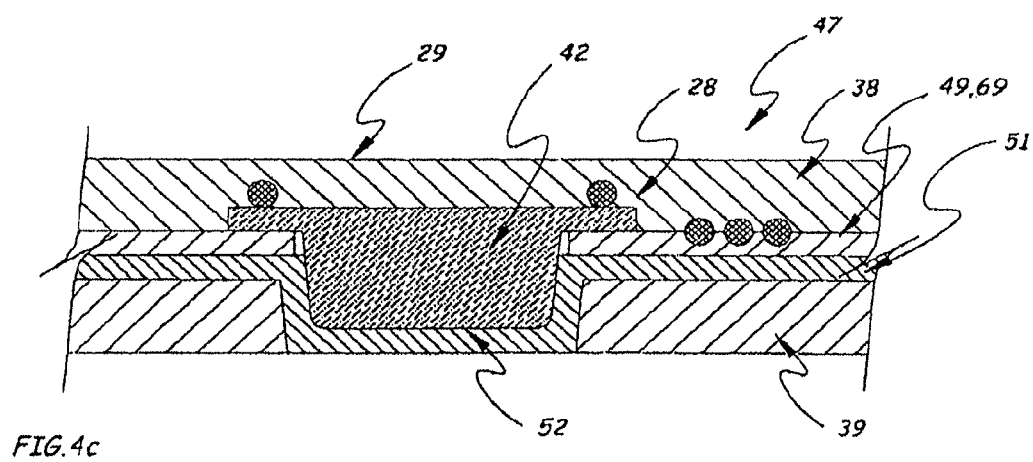

In FIGS. 4a through 4c, an alternative embodiment of the production of a security layered construction 47 is shown, elements corresponding in their embodiment in FIGS. 4a through 4c with the elements in FIGS. 3a through 3c being provided with corresponding identification numbers.

FIG. 4a shows a partial sectional illustration of a panel sheet 48 or 68, which, in contrast to the panel sheet 20 or 64, includes transponder substrates 49 or 69, each of which is provided with a window opening 50. The window opening 50 allows positioning of the chip arrangement 29 on the transponder substrate 49 or 69 with the chip housing 42 received countersunk in the window opening 50. After corresponding application of the chip arrangement 29, the antenna wire 31 is laid in a way already described with reference to FIG. 3a for producing a transponder layer 82 to implement an antenna 30 contacting the chip arrangement 29 in external contacts 34, 35.

As shown in FIG. 4b, the transponder substrate 49 or 69 is subsequently covered on top with a panel sheet 36 made of the previously described porous, elastic plastic material. A panel sheet 50, including seal layers 51 assigned to each of the transponder substrates 49 or 69, which are made of a thermoplastic like the transponder substrate 49 or 69, is positioned on the bottom of the transponder substrate 49 or 69. Subsequently, a panel sheet 37 made of the porous, elastic plastic material described above is applied to the panel sheet 50 having the seal layers 51.

The layered arrangement shown in FIG. 4b is subsequently processed in a laminator into a laminate, a protuberance 52 corresponding to the shape of the chip housing 42 now being implemented in the seal layers 51. The protuberance 52 projects into the window opening 40 of the lower cover layer 39 in this case.

Figure 5:
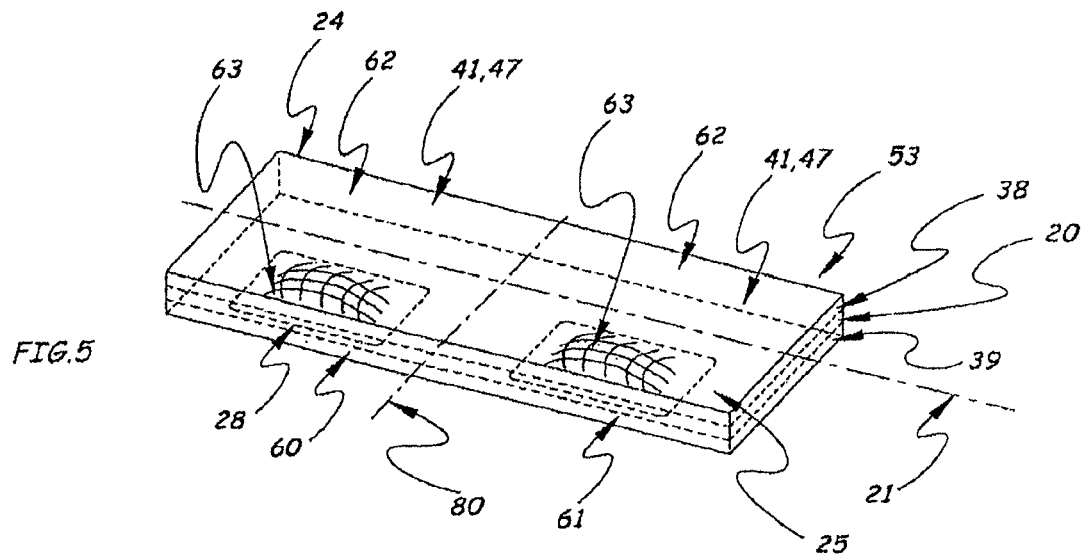
FIG. 5 shows a panel sheet including two security layered constructions for implementing ID pages.

The result of the method sequence shown in FIGS. 3a through 3c or respectively FIGS. 4a through 4c is, based on the panel sheet 20 shown in FIG. 1, a panel sheet 53 shown in FIG. 5 in laminate construction, including two security layered constructions 41 or 47 divided from one another by the middle axis 80 (FIG. 1), which are provided with transponder units 28. Corresponding to the double leaf blanks 24, 25, each security layered construction 41 or 47 may be used to implement an ID page 60, 61 after isolating the double leaf blanks 24, 25. In the present case, a region of a viewing side 62 of the cover layer 38, which covers each of the transponder units 28, is provided with security printing 63 as an authenticity feature.

If the security layered constructions 41, 47 are to be integrated into a book cover binding, the bottom and top cover layers 38, 39 are each also provided with a binding cover layer (not shown here in greater detail), the security printing being positioned on a viewing side of a binding cover layer in this case.

Figure 6:
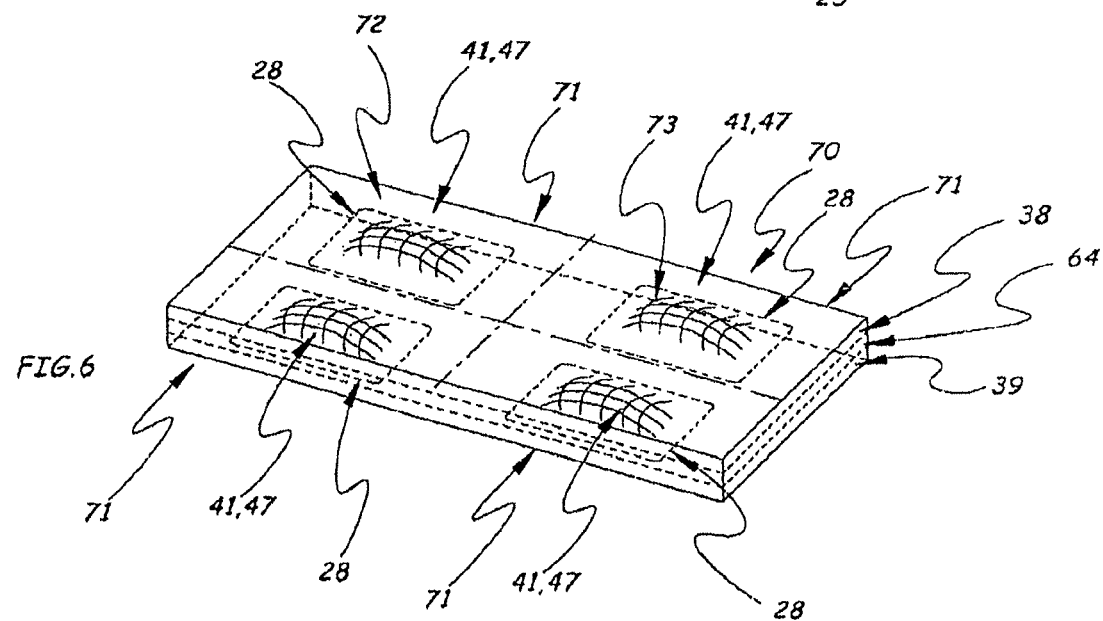
FIG. 6 shows a panel sheet including four security layered constructions for implementing personal documents in the chip card format.

The result of the method sequence shown in FIGS. 3a through 3c or respectively FIGS. 4a through 4c is, based on the panel sheet 64 shown in FIG. 2, a panel sheet 70, shown in FIG. 6 in laminate construction, including four security layered constructions 41 or 47, which are provided with transponder units 28. Corresponding to the outlines 65 (FIG. 2), each security layered construction 41 or 47 may now be used to implement a personal document 71 in the chip card format after isolation. In the present case, a region of a viewing side 72 of the cover layer 38, which covers each of the transponder units 28, is provided with security printing 73 as an authenticity feature.

Figure 7:
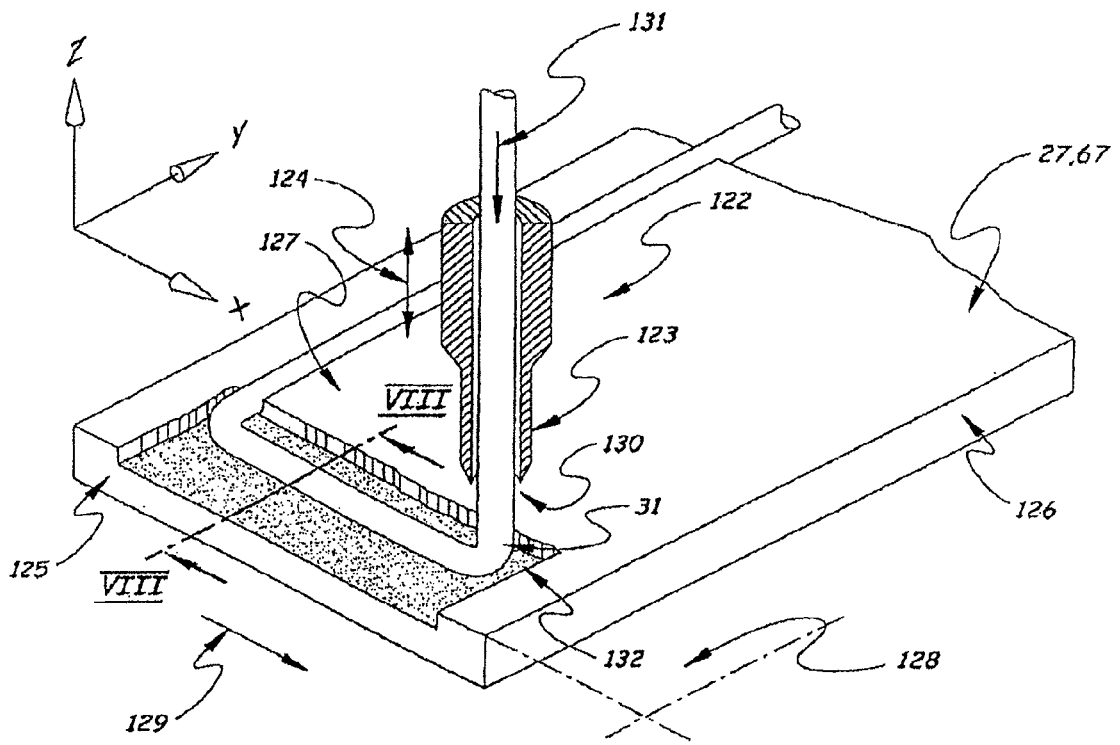
FIG. 7 shows a schematic illustration of the arrangement of a wire conductor using a wire conductor laying device on a transponder substrate.

FIG. 7 shows a schematic illustration of the laying of the antenna wire 31 on the transponder substrate 27, 67 using a wire conductor laying device 122, with ultrasound applied to it, having a wire guide 123.

The wire conductor laying device 122 illustrated in FIG. 7 is implemented as movable in three axes and has ultrasound applied to it, exciting the wire guide 123 to oscillating transverse movements (arrow 124), which are aligned perpendicularly to the laying plane 128 spanned by side edges 125, 126 of a substrate surface 127 in the example shown in FIG. 7.

For laying, the antenna wire 31 is moved out of a wire guide nozzle 130 while performing a continuous advancing movement in the direction of the arrow 131, the wire guide 123 simultaneously executing a laying movement 129 running parallel to the laying plane 128, which may be reconstructed in FIG. 7 from the shape of the wire conductor section already laid on the transponder substrate 27, 67. The oscillating transverse movement 124 is superimposed on this laying movement, which runs in the direction of the arrow 129 in the region of the forward side edge 125. Resulting from this, there occurs in rapid succession, corresponding to the ultrasound frequency, an incidence or impact of the wire guide nozzle 130 on the antenna wire 31, which leads to compression and/or displacement of the substrate material in the region of a contact point 132.

Figure 8:
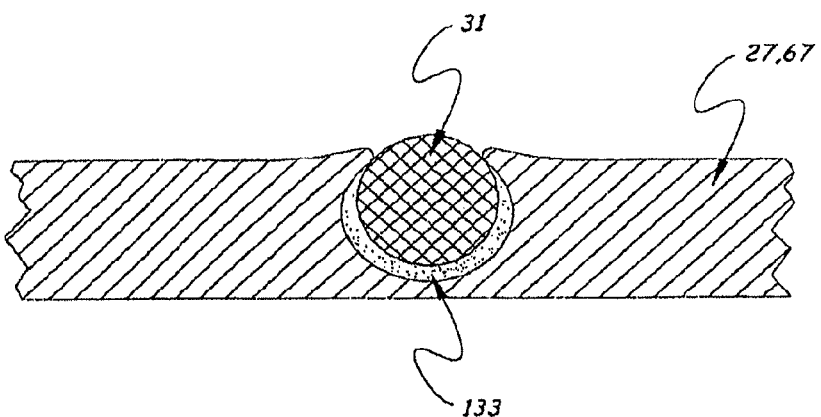
FIG. 8 shows an enlarged cross-sectional illustration of the cross-sectional region marked in FIG. 7 using section line VIII-VIII.

FIG. 8 shows the embedded arrangement of the antenna wire 31 in the transponder substrate 27, 67 in a sectional illustration which approximately corresponds to the section line VIII-VIII indicated in FIG. 7. The substrate illustrated here may also be a PVC film, this film having an ultrasound power of 50 W and an ultrasound frequency of 40 kHz, for example, applied to it via the wire conductor laying device 122 to embed the antenna wire 31. The pressure force using which the wire guide nozzle 130 is pressed against the substrate surface 127 may be in the range between 100 and 500 N for the above-mentioned substrate material. As may be seen from the illustration shown in FIG. 8, in an experiment which was performed, the antenna wire 31 was essentially embedded in the transponder substrate 27, 67 on the basis of a compression of the substrate material in a compression region 133 of the substrate material, implemented here in the shape of a crescent moon, by setting the above-mentioned parameters.

Figure 9:
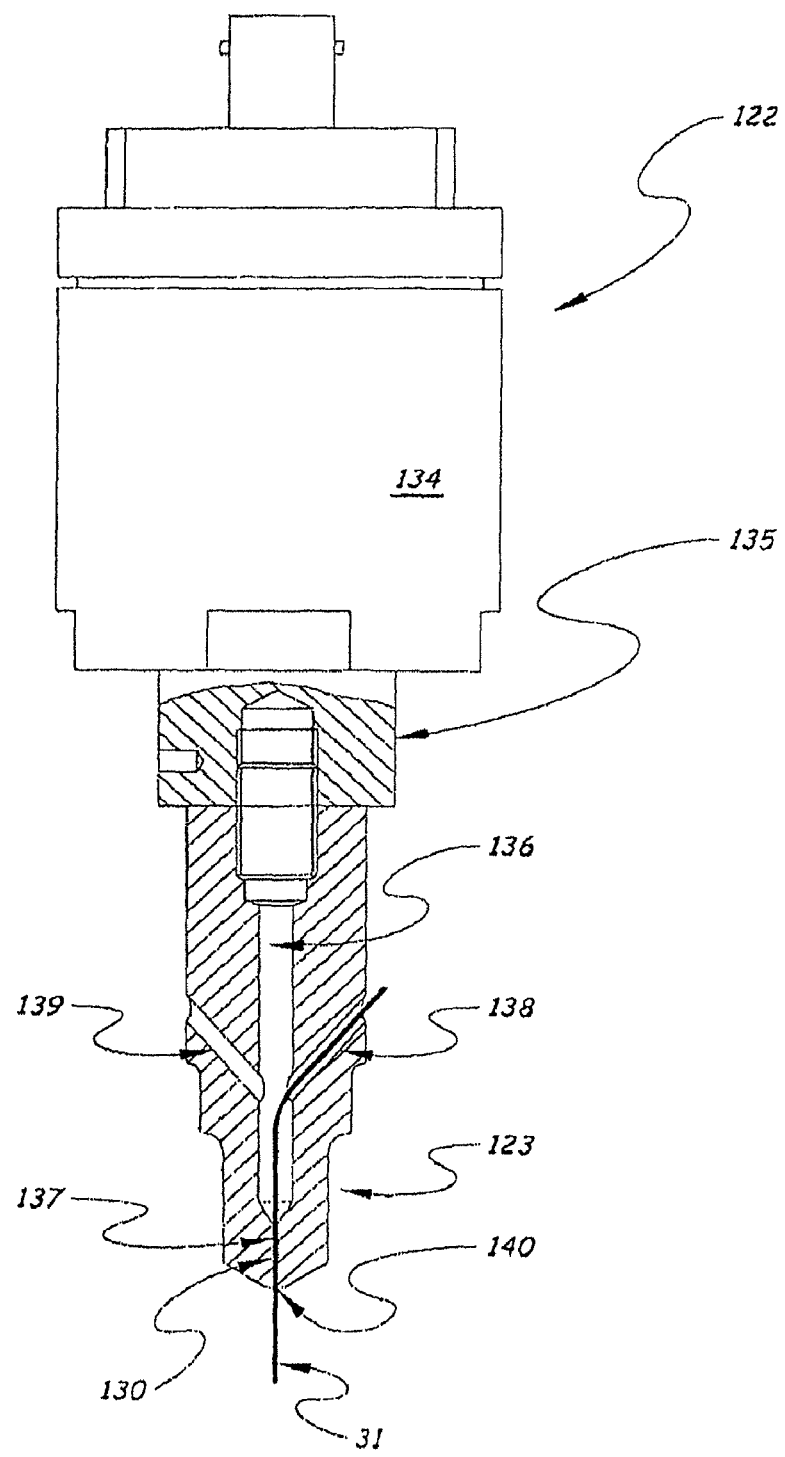
FIG. 9 shows a wire laying device for laying a wire conductor using ultrasound.

FIG. 9 shows the wire conductor laying device 122 in a single illustration having an ultrasound emitter 134, which is positioned coaxially to the wire guide 123 and is connected rigidly thereto in a connection region 135. The wire conductor laying device 122 shown in FIG. 9 is implemented as rotationally symmetric overall. The wire guide 123 has a central longitudinal hole 136, which changes into a wire capillary 137 in the region of the wire guide nozzle 130, having a diameter, tailored to the diameter of the antenna wire 31, that is narrower than that of the longitudinal hole 136. The wire guide capillary 137 is used primarily for the purpose of being able to align the antenna wire 31 precisely in the laying plane 128 (FIG. 7).

In the exemplary embodiment shown in FIG. 9, two wire supply channels 138, 139, which run diagonally downward in the direction toward the wire guide nozzle 130, are positioned laterally on the wire guide 123 above the wire guide nozzle, discharging into the longitudinal hole 136. The wire supply channels 138, 139 are used for lateral introduction of the antenna wire 31 into the wire guide 123, so that the antenna wire 31, shown in FIG. 9, runs laterally diagonally into the wire supply channel 138, through the longitudinal hole 136, and guided out of the wire guiding capillary 137 through the wire guide 123. In this case, the arrangement of multiple wire supply channels 138, 139 permits the selection of the particular most favorable wire supply side on the wire guide 123.

As may also be seen from FIG. 9, the wire guide nozzle 130 is implemented as convex in the region of a wire outlet opening 140, in order to allow the most careful possible deflection for the antenna wire 31 in the region of the contact point 132 (FIG. 7) or the wire outlet opening 140 during the laying procedure shown in FIG. 7.

Although it is not shown in greater detail in FIG. 9, the wire guide 123 may be provided with a wire cutting device and a wire advancing device. In this case, the wire cutting device may be integrated directly into the wire guide nozzle 130.

FIG. 10 shows a partial sectional illustration of the region of the antenna wire 31 shown in FIGS. 1 and 2 running over the chip arrangement 29.

FIG. 11 shows the wire ends 32 and 33 of an antenna 30, which is positioned on a transponder substrate 155 having a substrate recess 156 to receive a chip arrangement 158 (FIG. 12). In order to be able to guide the wire ends 32, 33 off over the substrate recess 156, similarly as in the region of the chip arrangement 29 in the exemplary embodiment shown in FIG. 10, the application of ultrasound to the antenna wire 31 is interrupted in the region of the substrate recess 156.

As may be seen further from FIG. 11 and, in addition, also from FIGS. 1 and 2, the contact ends (32, 33) run parallel to one another and transversely to a neighboring wire conductor strand (163), a bridge region (164) of the contact end (33) running over the neighboring wire conductor strand (163).

FIG. 12 shows, in a view of the transponder substrate 155 corresponding to the section line XII-XII in FIG. 11, the placement of the chip arrangement 158 in the substrate recess 156, in which the terminal areas 159 of the chip arrangement 158 are applied to the wire ends 32 and 33.

FIG. 13 shows the subsequent bonding of the terminal areas 159 of the chip unit 158 to the wire ends 32 and 33 using a thermode 160, which provides a material bond between the antenna wire 31 and the terminal areas 159 under the effect of pressure and temperature.

Furthermore, it is clear from FIGS. 12 and 13 that the substrate recess 156 is dimensioned in such a way that it essentially receives the chip arrangement 158. To simplify the alignment of the terminal areas 159 of the chip arrangement 158 during the placement of the chip unit 158 preceding the actual contacting, the chip unit 158 may be provided on its contact side 161 having the terminal areas 159 with an alignment aid 162, implemented here as web-like. The alignment aid 162 is dimensioned corresponding to the spacing a (FIG. 11), which the wire ends 32, 33 have from one another in the region of the substrate recess 156.

What is claimed is:

1. A method for producing a security layered construction for an identification document having a transponder layer and at least one cover layer, the method comprising:

producing the transponder layer comprising a transponder substrate having an antenna side and a back side, wherein the transponder layer is produced by positioning a wire conductor to implement at least one coil turn in one plane onto the surface of the antenna side of the transponder substrate using a wire conductor laying device, the wire conductor being bonded in one or more points to the transponder substrate and to terminal areas of a chip arrangement; and subsequent to the producing step, covering the antenna side of the transponder substrate with the at least one cover layer to form a seal with the wire conductor positioned interposed; and subsequent to the covering step, providing a viewing side of the transponder substrate with a security printing, wherein the viewing side of the transponder substrate is the back side of the transponder substrate.

2. The method according to claim 1, wherein the wire conductor is positioned on the transponder substrate such that the wire conductor is guided off over the terminal areas of the chip arrangement previously placed on the transponder substrate and the wire conductor is subsequently brought into contact with the terminal areas.

3. The method according to claim 2, wherein the transponder substrate, together with the chip arrangement placed on the transponder substrate, forms a base unit during the production of the security layered construction.

4. The method according to claim 1, wherein the wire conductor is positioned on the transponder substrate such that the contact ends of the wire conductor, provided for the contact with the chip arrangement, are guided off over a substrate recess used for receiving the chip arrangement, and, after placement of the chip arrangement in the substrate recess, are contacted with the terminal areas of the chip arrangement.

5. The method according to claim 1, wherein the wire conductor laying device is guided such that the contact ends run parallel to one another and transversely to a neighboring wire conductor strand.

6. The method according to claim 1, wherein the bonding of the wire conductor to the transponder substrate is performed through a continuous application of ultrasound to the wire conductor transversely to the longitudinal axis of the wire and to the surface of the transponder substrate.

7. The method according to claim 6, wherein the ultrasound application is performed using a stamp excited using ultrasound, which is provided with a wire guiding capillary parallel to the longitudinal axis to implement a guide nozzle.

8. The method according to claim 6, wherein the wire conductor is bonded to the transponder substrate by at least partially embedding the wire circumference in the surface of the transponder substrate.

9. The method according to claim 6, wherein the wire conductor is bonded to the transponder substrate by gluing one or more sections of the wire conductor to the surface of the transponder substrate.

* * * * *

UNITED STATES PATENT AND TRADEMARK OFFICE
CERTIFICATE OF CORRECTION

PATENT NO. : 8,279,070 B2  
APPLICATION NO. : 12/573763  
DATED : October 2, 2012  
INVENTOR(S) : Rietzler Page 1 of 1

It is certified that error appears in the above-identified patent and that said Letters Patent is hereby corrected as shown below:

Title Page, item [73] Assignee delete "Smartrac Technology Ltd."
and replace it with -- Smartrac IP B.V. --

Signed and Sealed this
Eleventh Day of June, 2013

Teresa Stanek Rea
*Acting Director of the United States Patent and Trademark Office*